Dec. 30, 1941.

H. C. KRONE ET AL 2,268,408

MULTIPLE FAUCET OR VALVE

Filed Aug. 14, 1941

4 Sheets-Sheet 3

INVENTORS:
Howard C. Krone & William Meyer,
BY
George D. Richards,
ATTORNEY.

Dec. 30, 1941.    H. C. KRONE ET AL    2,268,408
MULTIPLE FAUCET OR VALVE
Filed Aug. 14, 1941    4 Sheets-Sheet 4

INVENTORS:
Howard C. Krone & William Meyer,
BY George D. Richards
ATTORNEY.

Patented Dec. 30, 1941

2,268,408

UNITED STATES PATENT OFFICE 2,268,408

MULTIPLE FAUCET OR VALVE

Howard C. Krone, River Edge, and William Meyer, East Orange, N. J., assignors to A. W. Wheaton Brass Works, Newark, N. J., a corporation of New Jersey Application August 14, 1941, Serial No. 406,796

6 Claims. (Cl. 277—20)

This invention relates to a novel multiple faucet or like valve having a plurality of selectively associable valved intakes and outlets and means for simultaneously actuating the same when operatively associated.

This invention has for an object to provide a multiple faucet or valve having a plurality of selectively associable valved intakes and outlets, the intakes of which are respectively adapted to be connected in communication with a plurality of tanks or tank compartments, such e. g. as the several compartments of a tank truck used in transporting various kinds of petroleum or other products, and the outlets of which are adapted to be respectively connected with a meter equipped discharge means or conduit and an unmetered or gravity discharge means, whereby the discharged fluid may be optionally measured or not at the point of delivery thereof.

This invention has for another object to provide a multiple faucet or valve of the kind above mentioned wherein each intake is provided with its own spring-closed valve and each outlet is likewise provided with its own spring-closed valve, together with intake valve actuating means which is selectively movable into operative relation to any desired intake valve, and a similar valve actuating means which is selectively and independently movable into operative relation to a desired outlet valve, and further including means common to both valve actuating means whereby the selected intake and outlet valves to which they are operatively related may be simultaneously opened by manipulation of a single external valve control means.

Other objects of this invention, not at this time more particularly enumerated, will be understood from the following detailed description of the same.

Figure 1:
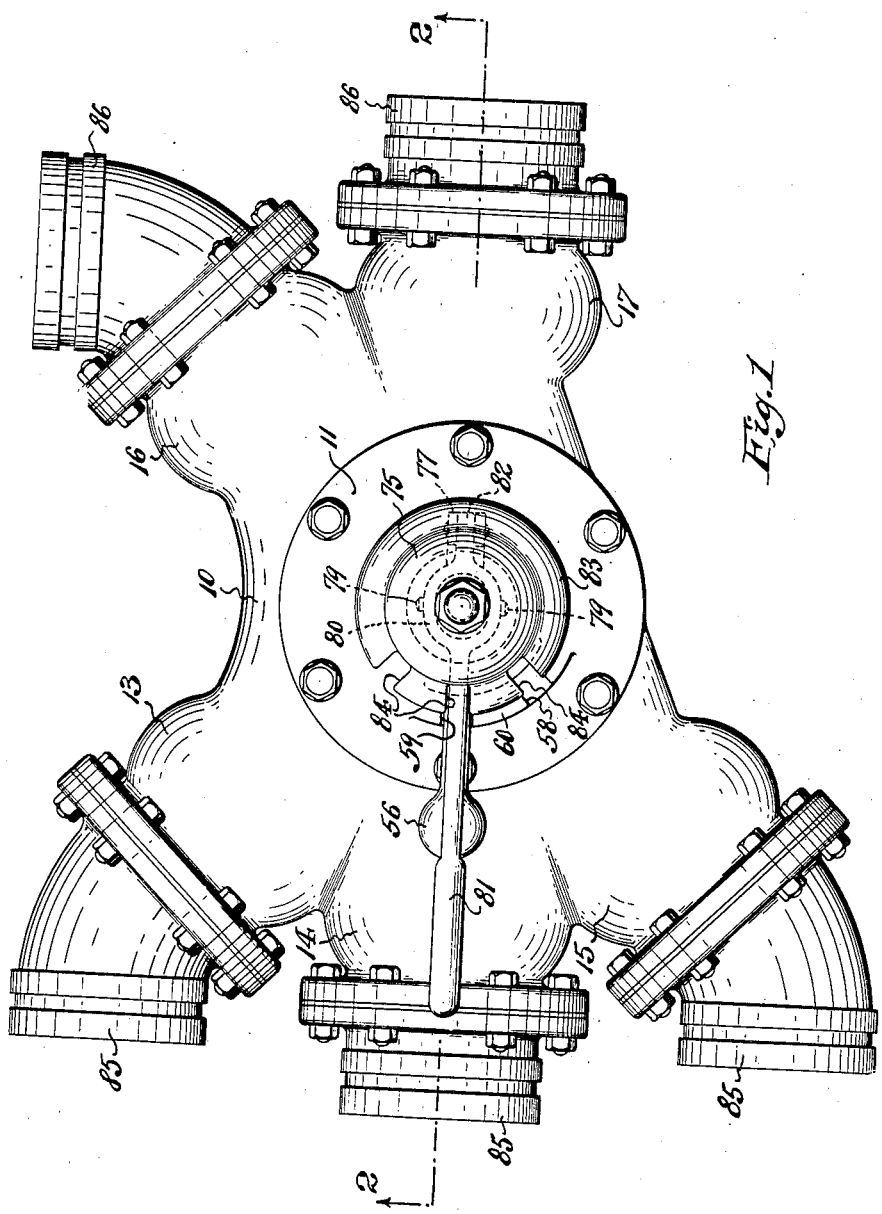
Figure 2:
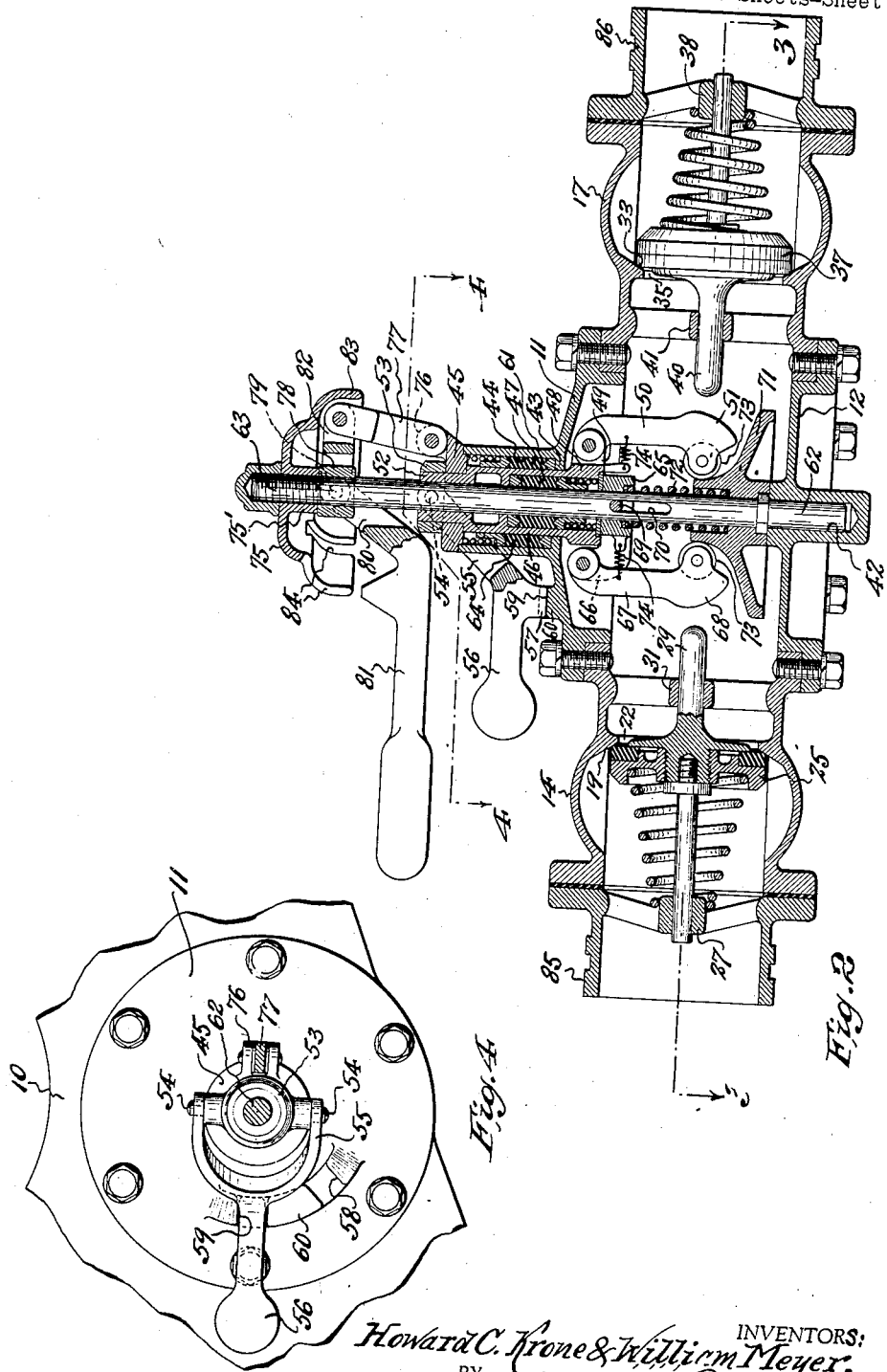
Figure 3:
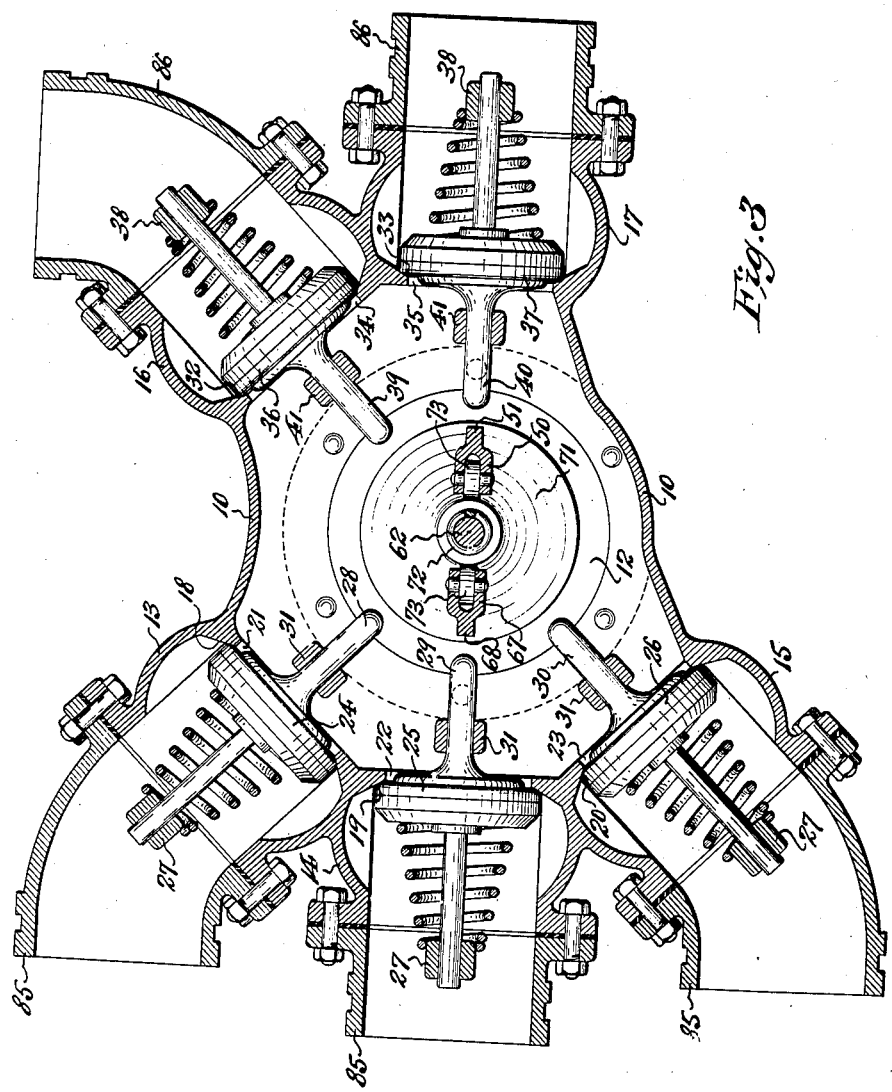
Figure 5:
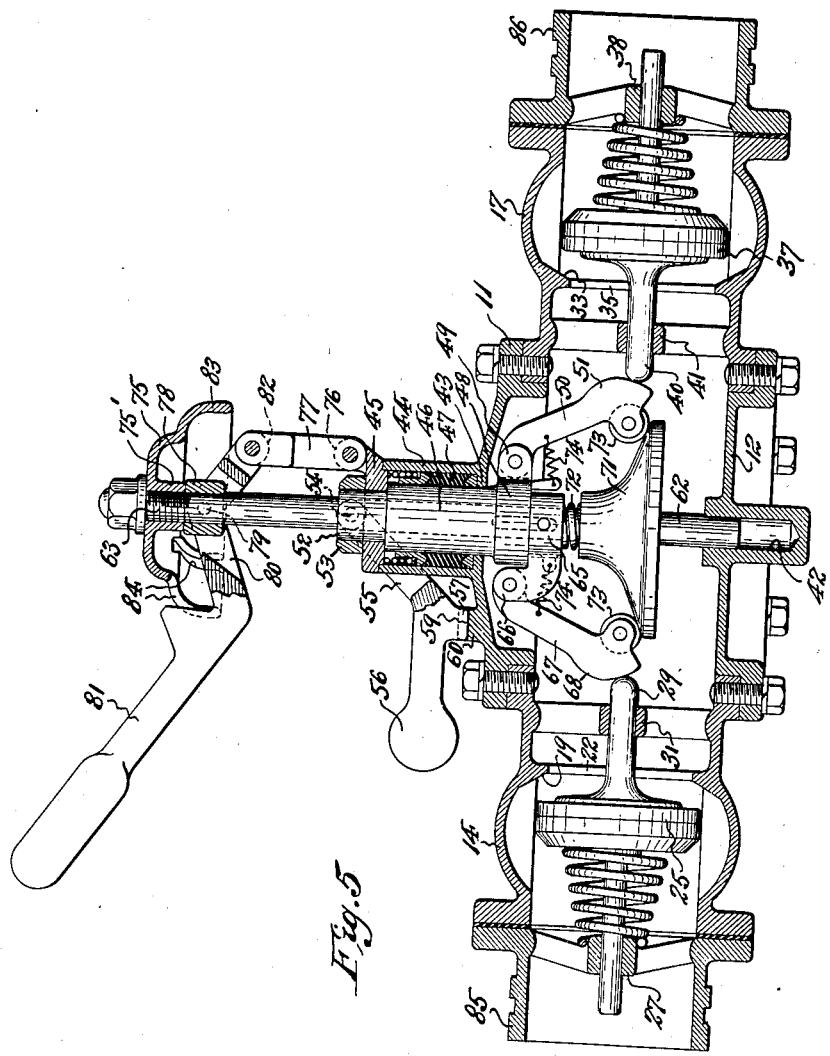

An illustrative embodiment of the novel multiple faucet or like valve according to this invention is shown in the accompanying drawings, in which:

Fig. 1 is a top plan view; Fig. 2 is a vertical sectional view, taken on line 2—2 in Fig. 1; Fig. 3 is a horizontal sectional view, taken on line 3—3 in Fig. 2; Fig. 4 is a fragmentary horizontal sectional view, taken on line 4—4 in Fig. 2; and Fig. 5 is a vertical sectional view similar to that of Fig. 2, but showing actuation of selected intake and outlet valves.

Similar characters of reference are employed in the hereinabove described views, to indicate corresponding parts.

Referring to the drawings, the valve casing comprises a main body section 10 provided with a top closure plate 11 and a bottom closure plate 12. Said main body section 10 is provided on one side with a plurality of radial intake sections, which, as illustratively shown, are three in number, but which may comprise more or less than three. Said intake sections are respectively indicated by the reference characters 13, 14 and 15.

Said main body 10 is provided on its other side with two radial outlet sections respectively indicated by the reference characters 16 and 17. One of said outlet sections, as e. g. 16, is adapted to be connected in communication with a meter equipped discharge conduit (not shown), while the other outlet section, viz. 17 is adapted to be connected in communication with an unmetered or free flow conduit (not shown).

The intake sections 13, 14 and 15 are respectively provided with annular valve seats 18, 19 and 20, which define their respective intake ports 21, 22 and 23. The respective ports 21, 22 and 23 are normally closed by outwardly opening spring-closed valves 24, 25 and 26, the stems of which are slidably supported by guide bearings 27. The valves 24, 25 and 26 are respectively provided with inwardly extending axial thrust members 28, 29 and 30, which are slidably supported by guide bearings 31, whereby the free ends thereof project radially into the interior of and toward the central vertical axis of the main body section 10 of the valve casing.

The outlet sections 16 and 17 are respectively provided with annular valve seats 32 and 33, which define their respective outlet ports 34 and 35. The respective ports 34 and 35 are normally closed by outwardly opening spring-closed valves 36 and 37, the stems of which are slidably supported by guide bearings 38. The valves 36 and 37 are respectively provided with inwardly extending axial thrust members 39 and 40, which are slidably supported by guide bearings 41, whereby the free ends thereof project radially into the interior of and toward the central vertical axis of the main body section 10 of the valve casing.

The bottom closure plate 12 is provided with a centrally disposed outwardly closed but inwardly open bearing portion 42, which is aligned with the central vertical axis of the valve casing. The top closure plate 11 is provided with a centrally disposed bearing portion 43, above which is provided a stuffing-box chamber 44, the latter being closed at its upper free end by a bearing cap 45; these parts being all aligned with the central vertical axis of the valve casing.

Journaled in the bearing portions 43 and bearing cap 45, so as to be capable of rotative movement, is a sleeve 46 which extends through the stuffing-box chamber 44. Surrounding said sleeve 46 within said stuffing-box chamber 44 is a suitable leak-proofing packing 47, which is preferably of the self-tightening type, as shown. The lower end portion 48 of said sleeve 46 extends into the upper interior portion of the valve casing, and is provided with a laterally projecting bearing knuckle 49, to which is pivotally connected a dependent outlet valve actuated lever 50. Said actuator lever 50 is provided at its free end with a suitably shaped cam portion 51 adapted to operatively engage a selected outlet valve thrust member, when moved, by rotation of the sleeve 46, into aligned opposition thereto.

Said sleeve 46 is provided with an externally projecting end portion 52 to which is affixed a collar 53 having oppositely and diametrically extending trunnions 54. Pivotally engaged with said trunnions 54 is the straddling yoke portion 55 of a hand lever 56. Said hand lever 56 overlies the top closure plate 11 of the valve casing, and is provided with a stop-nosing 57 adapted to be selectively engaged with cooperating notches 58 and 59 which are formed in a raised boss or rib 60 with which the top plate 11 is provided. The notch 58 is so positioned that, when the hand lever 56 is swung and dropped to engage its stop nosing 57 therewith, the sleeve 46 will be rotatively adjusted so as to operatively oppose the actuator lever 50 to the thrust member 39 of the valve 36 of the metered discharge outlet section 16. The notch 59 is so positioned that, when the hand lever 56 is swung and dropped to engage its stop-nosing 57 therewith, the sleeve 46 will be rotatively adjusted to operatively oppose the actuator lever 50 to the thrust member 40 of the valve 37 of the free flow discharge outlet section 17. Said sleeve 46 is interiorly formed to provide a second stuffing-box chamber 61.

Journaled in the bearing portion 42 to extend upwardly therefrom through the sleeve 46, and so as to be capable of both rotative and sliding movements, is an actuator shaft 62, the upper end portion 63 of which projects externally of the valve casing. Surrounding said actuator shaft 62 within the stuffing-box chamber 61, with which the sleeve 46 is provided, is a suitable leak-proofing packing 64, which is preferably of the self-tightening type, as shown. Said actuator shaft is thus disposed along the vertical axis of the valve casing and intermediate the surrounding intake and outlet valves. Mounted on said actuator shaft 62 within the interior of the valve casing beneath and in abutting relation to the inner end of the sleeve 46, is a collar 65. Said collar 65 is provided with a laterally projecting bearing knuckle 66, to which is pivotally connected a dependent intake valve actuator lever 67. Said actuator lever 67 is provided at its free end with a suitably shaped cam portion 68 adapted to operatively engage a selected intake valve thrust member, when moved, by rotation of the collar 65, into aligned opposition thereto. The collar 65 is coupled to the actuator 62 by a pin 69 and slot 70 connection, whereby the collar will rotate with shaft when the latter is turned, while the shaft may nevertheless slide freely through the collar.

Suitably mounted upon the lower end portion of the actuator shaft 62 is an annular lift cam 71 adapted to be vertically raised and lowered by axial sliding movements thereof. A compression spring element 72 is mounted around the actuator shaft 62 between said lift cam 71 and the collar 65, whereby the latter is retained in normal abutting relation to the lower end of the sleeve 46, while at the same time the shaft is downwardly urged to normal lowered position. Each actuator lever 50 and 67 is provided at the rearward side of its lower or free end portion with an anti-friction roller 73 adapted to be engaged by the lift cam 71, when the latter is raised and thus caused to impart outward swinging movements to said actuator levers 50 and 67. Each actuator lever is yieldably urged into cooperating relation to the lift cam 71 by a suitably anchored pull spring element 74.

Affixed to the external upper free end of the actuator shaft 62 is a knob 75 by means of which the shaft may be rotatably manipulated to selectively bring the intake valve actuator lever 67 into operative alignment with the selected intake valve desired at a given time to be opened.

The bearing cap 45 is provided with a bearing knuckle 76 to which is pivotally connected one end of a toggle link 77. Loosely mounted on the external end portion of the actuator shaft 62, beneath and so as to abut the hub 75' of the knob 75, is a collar 78. This collar is provided with oppositely and diametrically extending trunnions 79. Straddling said collar 78, and pivotally engaging the trunnions 79 thereof, is the yoke section 80 of a hand lever 81, the inner end portion 82 of which is pivotally connected with the free end of said toggle link 77.

Preferably the knob 75 of the actuator shaft 62 is provided with a peripheral depending skirt flange 83 in which are formed indented slots 84 corresponding in number and angular spacing respectively to the intake valve sections 13, 14 and 15 and their intake valves. By grasping and turning the knob 75, the actuator shaft 62 may be rotated to revolve the collar 65 so as to selectively position the intake valve actuator lever 67 in operative aligned opposition to the thrust member of a given intake valve desired at a given time to be opened. When the knob 75 is thus turned for the purposes mentioned, an indented slot 84 thereof, which corresponds to the intake valve selected for operation, will be aligned with and thus disposed to receive the hand lever 81 when the latter is up-swung. It will be obvious that the slots 84 may be numbered or otherwise identified in correspondence with the respective intake valves, so that when a given slot 84 is aligned with or opposed to the hand lever 81, it will be indicated to the operator that the intake valve actuator arm 67 is operatively related to the corresponding intake valve thus selected for operation.

The outer ends of the valve casing intake sections 13, 14 and 15 may respectively be provided with adapters or coupling connections 85 of a suitable form adapted to cooperate with means to couple said sections with the discharge conduits (not shown) which lead from the respective tanks or tank compartments to be served by the respective intake valves. In like manner, the outer ends of the valve casing outlet sections 16 and 17 may be respectively provided with adapters or coupling connections 86 of suitable form adapted to cooperate respectively with a meter equipped discharge conduit and a free flow conduit.

In the use and operation of the above described multiple faucet or valve, if the fluid delivered therethrough is to be measured by discharge through the meter equipped delivery conduit connected with the outlet section 16, the operator first releases and swings the hand lever 56 to turn the sleeve 46 so as to operatively oppose the outlet valve actuator lever 50 to the thrust member 39 of the outlet valve 36. If, however, the fluid to be delivered is not to be measured then, the operator rotates the sleeve 46 so as to operatively oppose the outlet valve actuator lever 50 to the thrust member 40 of the outlet valve 37, this latter setting being shown in the drawings.

The outlet valve to be actuated having been selected in the manner described, the operator then selects the intake valve desired to be operated to deliver a fluid from a selected source served by the latter. This is done by rotating the knob 75 to bring the intake valve actuator lever 67 into opposition to the thrust member of the intake valve desired to be opened, in the manner hereinbefore described.

The intake and outlet valves desired to be opened having been thus selected, these valves may simultaneously be opened to the passage of fluid through the faucet or valve by swinging up the hand lever 81, the upward limit of movement of which may be determined by entrance thereof into an opposed slot 84 of the knob 75, thereby locking the knob and the actuator shaft 62 against rotative displacement or other manipulation while given actuated intake and outlet valves remain open. As the hand lever 81 is up-swung, it pivots on the toggle link 77 as a fulcrum, and thus imparts a lifting movement to the collar 78 with which it is also pivotally connected. The upwardly moved collar 78 thrusts upwardly against the hub 75' of the knob 75, thereby imparting to the actuator shaft 62 an upward sliding movement. The upward movement of the actuator shaft 62 in turn lifts the lift cam 71, which thrusts against the actuator levers 50 and 67 so that the same are outswung to carry their cam portions 51 and 68 respectively against the thrust members of the respective intake and outlet valves to which they are opposed. Such outswinging movement of the actuator levers transmits motion to the engaged intake and outlet valves, so that the same are moved, against the tension of their closing springs, off their seats, thereby opening the valve ports, which are controlled by said valves, to the flow of fluid therethrough.

It will be obvious that the novel faucet or valve of this invention affords a very convenient and efficient means for controlling discharge of fluid from a selected one of a plurality of sources of supply as well as delivery of the discharged fluid electively through meter equipped delivery means or free flow delivery means. The novel faucet or valve of this invention is therefore of special advantage as a discharge faucet valve means for compartment truck tanks used in the transportation and delivery of various kinds of petroleum products.

It will be understood that various changes could be made in the construction and arrangement of the various parts and elements of the mechanisms above described as providing an illustrative embodiment of the novel multiple faucet or like valve of this invention without departing from the spirit of the invention as defined by the appended claims. It is, therefore, intended that all matter contained in the above description or shown in the accompanying drawings shall be interpreted as illustrative and not in a limiting sense.

We claim:

1. A multiple faucet or like valve comprising, a casing having a plurality of intakes each having a spring-closed valve and a plurality of outlets each having a spring-closed valve, an adjustable intake valve actuating means selectively movable into cooperative relation to a desired intake valve, an independently adjustable outlet valve actuating means selectively movable into cooperative relation to a desired outlet valve, and means common to both said intake and outlet valve actuating means adapted to simultaneously operate the same for opening both the selected intake valve and the selected outlet valve, said latter means including external means for manual operation thereof.

2. A multiple faucet or like valve comprising, a casing having a plurality of intakes each having a spring-closed valve and a plurality of outlets each having a spring-closed valve, an adjustable intake valve actuating means, means including external manipulating means for selectively disposing said intake valve actuating means in position ready to open a desired intake valve, an independently adjustable outlet valve actuating means, a second means including its own external manipulating means for selectively disposing said outlet valve actuating means in position ready to open a desired outlet valve, and means common to both intake and outlet valve actuating means adapted to operate the latter to simultaneously open the selected intake and outlet valves, said latter means including its own external manipulating means.

3. A multiple faucet or like valve comprising, a casing having a plurality of radial intakes each having a spring-closed valve and a plurality of radial outlets each having a spring-closed valve, an actuator shaft mounted to extend axially into said casing subject to both rotative and axial sliding movements, a sleeve mounted on said shaft to extend into said casing subject to rotative movement independently of the shaft, intake valve actuating means selectively adjustable to cooperate with a desired intake valve, outlet valve actuating means selectively adjustable to cooperate with a desired outlet valve, means mounted on said shaft so as to move solely by rotation thereof whereby to carry and movably adjust one of said valve actuating means, said sleeve being adapted to carry and movably adjust the other of said valve actuating means, external means for rotatably adjusting said shaft, external means for rotatably adjusting said sleeve, means operable by axial movement of said shaft adapted to operate said valve actuating means to open selected intake and outlet valves, and external means for imparting axial movement to said shaft.

4. A multiple faucet or like valve as defined in claim 3, including leakproofing packing means surrounding both said shaft and sleeve.

5. A multiple faucet or like valve comprising, a casing having a plurality of radial intakes at one side thereof each having a spring-closed valve and a plurality of radial outlets at the opposite side thereof each having a spring-closed valve, said valves having thrust members at their inner sides adapted to converge toward the central vertical axis of said casing, an actuator shaft mounted to extend axially into said casing subject to both rotative and axial sliding movements, a sleeve mounted on said shaft to extend into said casing subject to rotative movement independently of said shaft, an outlet valve actuator lever pivotally connected with said sleeve to depend therefrom, a collar mounted on said shaft, means to connect said collar with said shaft for rotation therewith while permitting axial sliding movement of said shaft therethrough, an intake valve actuator lever pivotally connected with said collar to depend therefrom, external means for rotatably adjusting said shaft and collar to operatively oppose said intake valve actuator lever to the thrust member of a selected intake valve, external means for rotatably adjusting said sleeve to operatively oppose said outlet valve actuator lever to the thrust member of a selected outlet valve, a lift cam carried by said shaft operable by axial movement of the latter to swing said actuator levers into valve opening engagement with the thrust members of the selected valves, and a pivoted hand lever means cooperative with the exterior portion of said shaft for imparting operative axial movement to said shaft and lift cam.

6. A multiple faucet or like valve as defined in claim 5 including leak-proofing packing means surrounding both said shaft and sleeve.

HOWARD C. KRONE.
WILLIAM MEYER.